US012575548B2

(12) United States Patent
Cho

(10) Patent No.: US 12,575,548 B2
(45) Date of Patent: Mar. 17, 2026

(54) AIR-LIFTING VENTURI APPARATUS

(71) Applicant: AQUA DEVELOPMENT LTD., Busan (KR)

(72) Inventor: Yong Kil Cho, Seoul (KR)

(73) Assignee: AQUA DEVELOPMENT LTD., Seoul (KR)

( * ) Notice: Subject to any disclaimer, the term of this patent is extended or adjusted under 35 U.S.C. 154(b) by 520 days.

(21) Appl. No.: 18/148,206

(22) Filed: Dec. 29, 2022

(65) Prior Publication Data

US 2023/0144114 A1 May 11, 2023

Related U.S. Application Data

(63) Continuation of application No. PCT/KR2021/008335, filed on Jul. 1, 2021.

(30) Foreign Application Priority Data

Jul. 2, 2020 (KR) ........................ 10-2020-0081654

(51) Int. Cl.
*A01K 63/04* (2006.01)

(52) U.S. Cl.
CPC .................................. *A01K 63/042* (2013.01)

(58) Field of Classification Search
CPC .......... A01K 63/042; B01F 23/231121; B01F 23/232312
See application file for complete search history.

(56) References Cited

U.S. PATENT DOCUMENTS

| | | | |
|---|---|---|---|
| 3,193,260 A | * | 7/1965 | Lamb .................... B01F 33/503 |
| | | | 261/24 |
| 3,732,668 A | * | 5/1973 | Nichols .................. B64D 37/32 |
| | | | 96/174 |
| 3,984,323 A | | 10/1976 | Evens |
| 4,181,614 A | * | 1/1980 | Steenhorst ......... B01D 21/2466 |
| | | | 210/221.2 |

(Continued)

FOREIGN PATENT DOCUMENTS

| | | | |
|---|---|---|---|
| DE | 2253919 A1 | * | 5/1974 |
| DE | 2447607 | | 4/1976 |

(Continued)

OTHER PUBLICATIONS

English Machine Translation of DE 2253919 A1 (Year: 1974).*

(Continued)

*Primary Examiner* — Charles S Bushey
(74) *Attorney, Agent, or Firm* — LEX IP MEISTER, PLLC

(57) ABSTRACT

The present disclosure relates to an air lifting Venturi apparatus including a first inflow pipe extending in the form of a tube to guide inflow of water; a second inflow pipe extending in the form of a tube to guide inflow of air or oxygen; a Venturi pipe including a through passage having a neck portion having a diameter smaller than a diameter of an inflow port between the inflow port and an outflow port, wherein the first inflow pipe is connected to the inflow port and the second inflow pipe is connected to the neck portion; a spray nozzle connected to the outflow port of the Venturi pipe; and an air guide extending obliquely from an upper end of the Venturi pipe toward an upper portion of the spray nozzle in a spray direction.

7 Claims, 4 Drawing Sheets

(56)                    References Cited

U.S. PATENT DOCUMENTS

| | | | | |
|---|---|---|---|---|
| 4,532,038 | A | * | 7/1985 | Reid ................. B01F 23/23413 |
| | | | | 210/219 |
| 5,595,691 | A | * | 1/1997 | Hsu ......................... C02F 3/201 |
| | | | | 261/123 |
| 12,232,487 | B2 | * | 2/2025 | Cho ................. B01F 25/31241 |
| 2003/0044332 | A1 | | 3/2003 | Conrad et al. |
| 2008/0048348 | A1 | | 2/2008 | Kung |

FOREIGN PATENT DOCUMENTS

| | | | | |
|---|---|---|---|---|
| DE | 4312971 | A1 | | 10/1994 |
| FR | 2437866 | A1 | * | 4/1980 |
| FR | 2578832 | A1 | * | 9/1986 |
| JP | 11333491 | A | | 12/1999 |
| JP | 2006142300 | A | | 6/2006 |
| JP | 2012176335 | A | | 9/2012 |
| KR | 1020070102367 | A | | 10/2007 |
| KR | 2020120001483 | U | | 3/2012 |
| KR | 1020130067536 | A | | 6/2013 |
| KR | 101852968 | B1 | * | 4/2018 |
| KR | 101950140 | B1 | | 2/2019 |
| WO | 2009-107386 | | | 9/2009 |

OTHER PUBLICATIONS

English Machine Translation of FR 2437866 A1 (Year: 1980).*
English Machine Translation of FR 2578832 A1 (Year: 1986).*
English Machine Translation of KR 101852968 B1 (Year: 2018).*
EPO, Office Action of EP 21831835.0 dated Nov. 25, 2025, total 8 pages.

* cited by examiner

FIG. 4

AIR-LIFTING VENTURI APPARATUS

FIELD OF THE INVENTION

The present disclosure relates to an air lifting Venturi apparatus installed in a water tank of a fish farm to flow in and lift air.

BACKGROUND OF THE INVENTION

Demand for fresh fish or seafood that is preferred as health food compared to meat is continuously increasing due to a preference phenomenon for well-being food according to the improvement of the standard of living of the people. Due to such an increase in the demand, indiscriminate overfishing of fish is occurring in coastal waters, and a water quality environment also deteriorates due to an environmental pollution caused by the industrial development, and natural resources of fish population are continuously decreasing.

In such a situation, it is expected that the aquaculture industry as a breeding fishery rather than a catching fishery will be more active than before as the industry proceeds in a direction of resolving the mismatch between demand and supply of seafood. However, because shallow sea aquaculture in coastal waters is not stable due to various risk factors such as natural disasters and water pollution as well as various diseases, onshore installation type aquaculture tanks that cultivate various fish species by installing aquaculture tanks on shore rather than in the sea are becoming popular.

In general, because water (seawater or freshwater) accommodated in the onshore installation type aquaculture tank is mixed with the leftover feed of fish and fish excretions are mixed with the feed, when the water is left for a long time, the amount of dissolved oxygen decreases, leading to the death of fish in the tank.

Therefore, in order to supply sufficient oxygen in the water in the tank, an aberration wheel, an air disperser, etc. are utilized, or liquid oxygen, high pressure oxygen, an oxygen generator, etc. are applied. However, these apparatuses may not be efficient depending on fish species while requiring excessive facility investment, and there is a problem in that aquaculture production costs increase because management and operation of these apparatuses require a lot of cost.

One aspect of the present disclosure is to provide an air lifting Venturi apparatus capable of smoothly supplying dissolved oxygen in a tank of a fish farm.

However, the problems to be solved by the embodiments of the present invention are not limited to the above problems and may be variously extended within the scope of the technical idea included in the present invention.

BRIEF SUMMARY OF THE INVENTION

According to an embodiment of the present invention, an air lifting Venturi apparatus includes a first inflow pipe extending in the form of a tube to guide inflow of water, a second inflow pipe extending in the form of a tube to guide inflow of air or oxygen, a Venturi pipe comprising a through passage having a neck portion having a diameter smaller than a diameter of an inflow port between the inflow port and an outflow port, wherein the first inflow pipe is connected to the inflow port and the second inflow pipe is connected to the neck portion, a spray nozzle connected to the outflow port of the Venturi pipe, and an air guide extending obliquely from an upper end of the Venturi pipe toward an upper portion of the spray nozzle in a spray direction.

The air guide may be configured in a plate shape having a cross-section convexly rounded upward.

The air guide may extend to a height close to an upper end portion of the second inflow pipe.

The air guide may include a support extending from an upper surface and having one end fixed to the second inflow pipe.

The support may include a first support located close to an upper end portion of the second inflow pipe and a second support located close to a Venturi pipe connection portion of the second inflow pipe.

The first inflow pipe may include an inflow portion having an open upper portion and extending vertically and a connection portion extending from a lower end of the inflow portion and bent to be connected to the inflow port of the Venturi pipe.

A diameter of the second inflow pipe may be formed to be smaller than a diameter of the first inflow pipe.

A diameter of the spray nozzle may be formed to be smaller than the diameter of the inflow port of the Venturi pipe.

According to the air lifting Venturi apparatus according to an embodiment of the present invention, air sprayed through the Venturi pipe may stay in the water tank for a longer time, which has the effect of increasing the dissolved oxygen content in the water tank.

In addition, when the air bubbles with kinetic energy to rise vertically are moved forward using the air guide, there is the effect of moving the water forward together, which has the effect of accelerating a water circulation necessary for aquaculture.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4 is a diagram for explaining a state in which an air lifting Venturi apparatus according to an embodiment of the present invention is installed and operates in a water tank.

Figure 1:
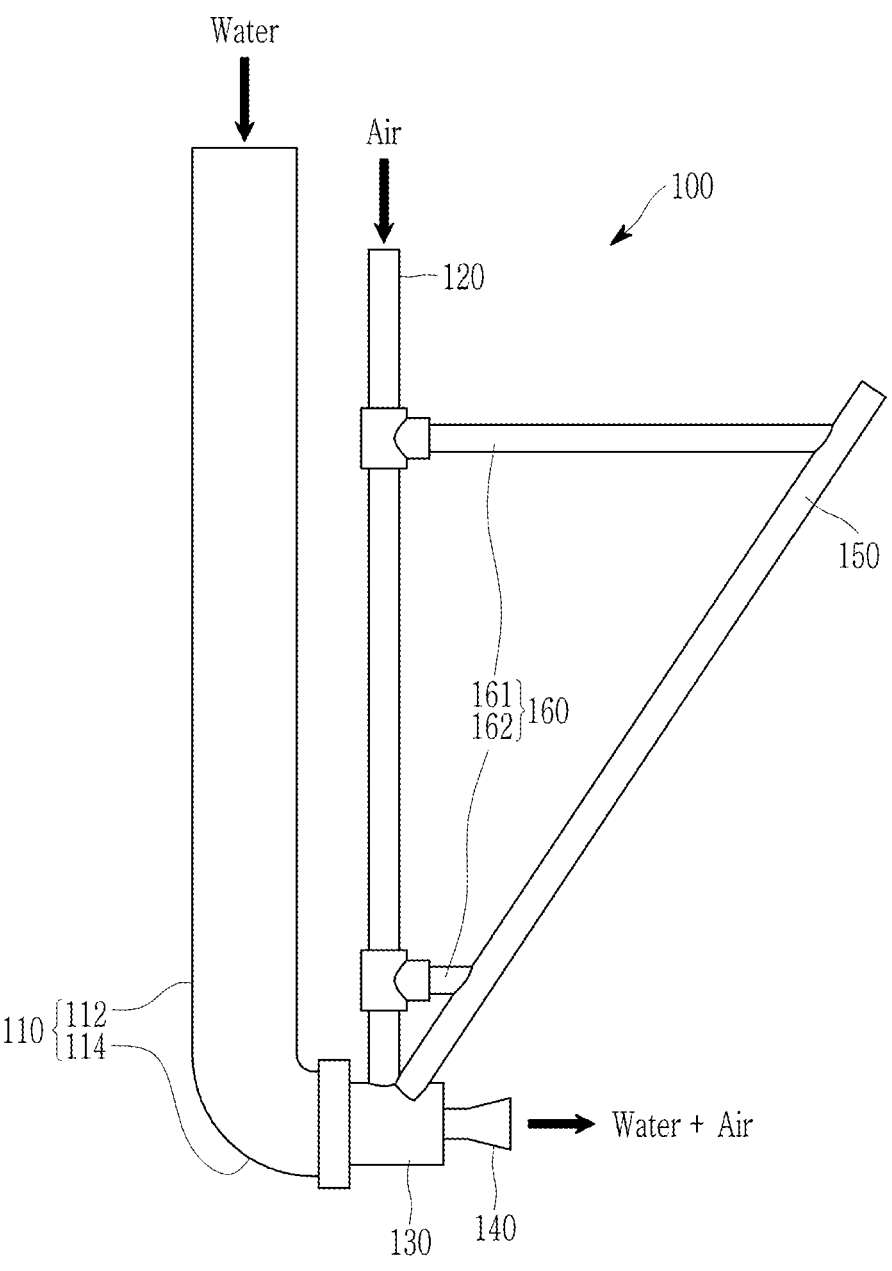
FIG. 1 is a front view showing an air lifting Venturi apparatus according to an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Hereinafter, it will be described in detail with reference to the accompanying drawings so that those skilled in the art may easily carry out the present invention. In order to clearly describe the present invention in the drawings, parts irrelevant to the description are omitted, and the same reference numerals are attached to the same or similar components throughout the specification. In addition, the accompanying drawings are only for easy understanding of the embodiments disclosed in the present specification, do not limit the technical idea disclosed in the present specification, and should be understood to include all changes, equivalents or substitutes included in the spirit and scope of the present disclosure.

The terms including an ordinal number, such as first, second, etc., may be used to describe various components, but the components are not limited by the terms. These terms are used only for the purpose of distinguishing one component from another.

It will be understood that when a component is referred to as being "connected" or "coupled" to another component, the component may be directly connected or coupled to the other component, but other components may exist therebetween. On the other hand, it will be understood that when a component is referred to as being "directly connected" or "directly coupled" to another a component, no other component exists therebetween.

Throughout the specification, it will be further understood that the terms "comprises" and/or "comprising," when used in the present specification, specify the presence of stated features, integers, steps, operations, components, and/or parts, but do not preclude the presence or addition of one or more other features, integers, steps, operations, components, parts, and/or combinations thereof. Therefore, when a part "includes" a certain component, it means that the part does not exclude other components but may further include other components unless otherwise stated.

Figure 2:
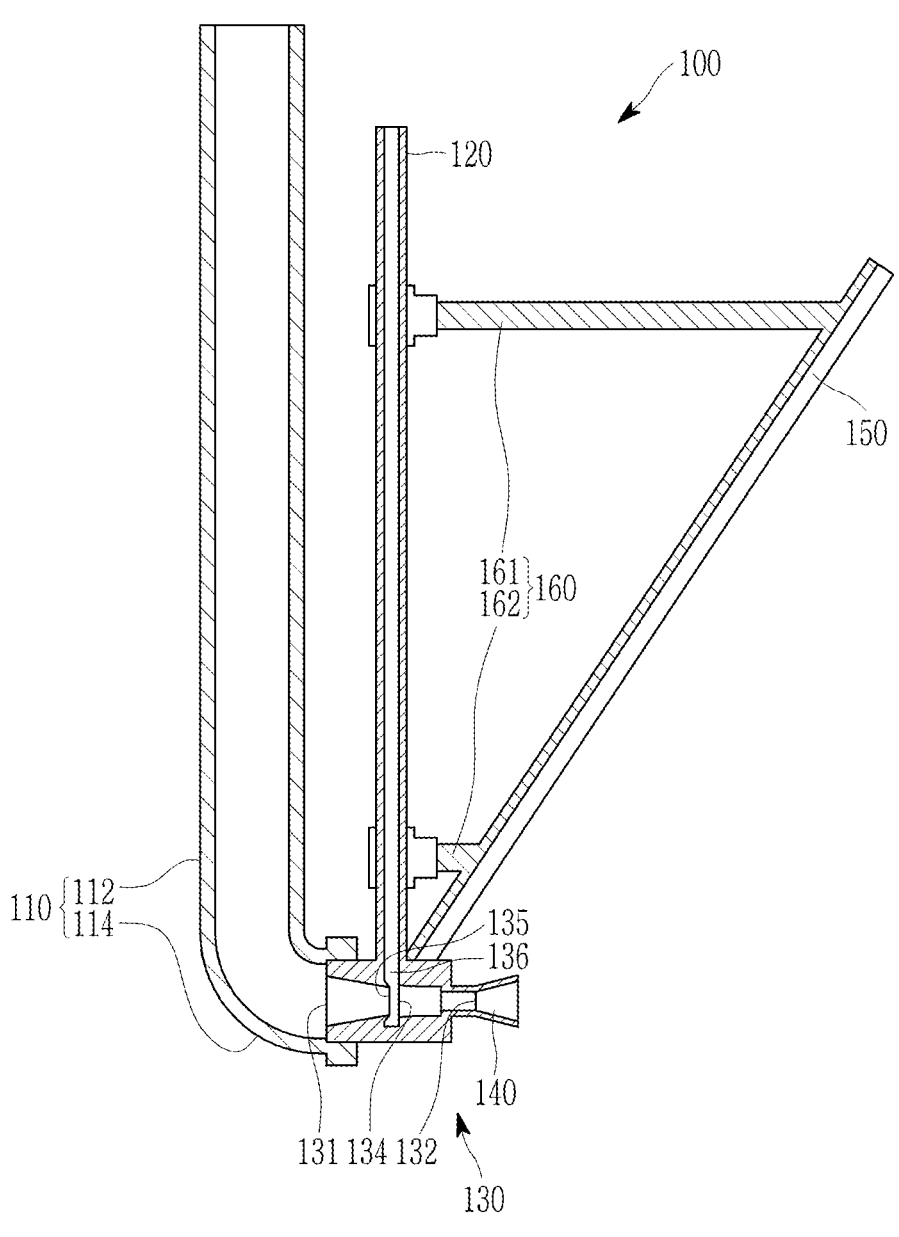
FIG. 2 is a cross-sectional view showing the air lifting Venturi apparatus shown in FIG. 1 cut along a plane parallel to the ground.

FIG. 1 is a front view showing an air lifting Venturi apparatus according to an embodiment of the present invention. FIG. 2 is a cross-sectional view showing the air lifting Venturi apparatus shown in FIG. 1 cut along a plane parallel to the ground.

Referring to FIG. 1, an air lifting Venturi apparatus 100 according to the present embodiment includes a first inflow pipe 110 guiding the inflow of water, a second inflow pipe 120 guiding the inflow of air or oxygen, and a Venturi pipe 130 to which each of the first inflow pipe 110 and the second inflow pipe 120 is connected. The first inflow pipe 110 and the second inflow pipe 120 may be elongated in the form of a tube, and may provide passages through which water and air may move, respectively.

An air guide 150 extending obliquely toward a front upper portion from an upper end of the Venturi pipe 130 may be formed at the upper end of the Venturi pipe 130 and may extend to a height close to an upper end portion of the second inflow pipe 120. The air guide 150 may be fixed to the second inflow pipe 120 through a support 160. The support 160 may extend from an upper surface of the air guide 150 and have one end fixed to the second inflow pipe 120. The support 160 may comprise a plurality of supports and may include a first support 161 located close to the upper end portion of the second inflow pipe 120 and a second support 162 located close to a Venturi pipe connection portion of the second inflow pipe 120.

Referring to FIG. 2, the first inflow pipe 110 may include an inflow portion 112 having an open upper portion and vertically extending and a connection portion 114 that is bent by being connected to a lower end of the inflow portion 112 and connected to the Venturi pipe 130.

The Venturi pipe 130 may include an inflow port 131 and an outflow port 132, and may have a neck portion 134 having a smaller diameter than the inflow port 131 between the inflow port 131 and the outflow port 132. Here, the first inflow pipe 110 may be connected to the inflow port 131 and the second inflow pipe 120 may be connected to the neck portion 134. In addition, the Venturi pipe 130 may further include an injection nozzle 135 protruding to be tapered from the neck portion 134 in a fluid flow direction. In addition, a spray nozzle 140 may be connected to the outflow port 132 of the Venturi pipe 130. The spray nozzle 140 may have a diffuser structure in which the diameter gradually increases again from the outflow port 132 of the Venturi pipe 130.

The inflow portion 112 of the first inflow pipe 110 and the second inflow pipe 120 may extend vertically downward in parallel with each other. Here, the diameter of the second inflow pipe 120 may be formed to be smaller than the diameter of the inflow portion 112 of the first inflow pipe 110. The first inflow pipe 110 may be connected to the Venturi pipe 130 as the connection portion 114 that extends from the inflow portion 112 and bent is connected to the inflow port 131 of the Venturi pipe 130. The second inflow pipe 120 may be fixed to a side surface of the Venturi pipe 130 and may be connected to the neck portion 134 through a lateral passage 136.

As described above, the diameter of the neck portion 134 of the Venturi pipe 130 may be smaller than the diameter of the inflow port 131. In addition, the diameter of the spray nozzle 140 may be formed to be smaller than the diameter of the inflow port 131 of the Venturi pipe 130, and may be formed such that the diameter of the spray nozzle 140 is such that the diameter of the spray nozzle 140 gradually increases from the outflow port 132 of the Venturi pipe 130 in the fluid flow direction.

The Venturi pipe 130 configured as described above may be utilized as an apparatus for supplying dissolved oxygen in an aquaculture water tank using the Bernoulli principle. Air may flow in through the second inflow pipe 120 due to a negative pressure generated by a flow rate increased when water drawn up by using a pump installed in a breeding water tank (e.g., a recirculating filtration tank) passes through the first inflow pipe 110 and be supplied into the Venturi pipe 130, and again passes through the neck portion 134 having the diameter narrowing to several millimeters in the Venturi pipe 130. The flowed air may be mixed with water while passing through the Venturi pipe 130. The water and air mixed as above may be sprayed again into the breeding water tank (e.g., a fish breeding water tank) through the spray nozzle 140. At this time, because the air contains about 21% of oxygen component, oxygen contained in small air bubbles strongly ejected from the spray nozzle 140 may be supplied into the water tank, and thus, oxygen may be supplied. In the case of ultra-high density aquaculture, a large amount of oxygen is required. In this regard, an oxygen supply pipe (not shown) connecting the second inflow pipe 120 used for air inflow may be installed and connected to an oxygen storage facility, and thus, pure oxygen may be also supplied.

Figure 3:
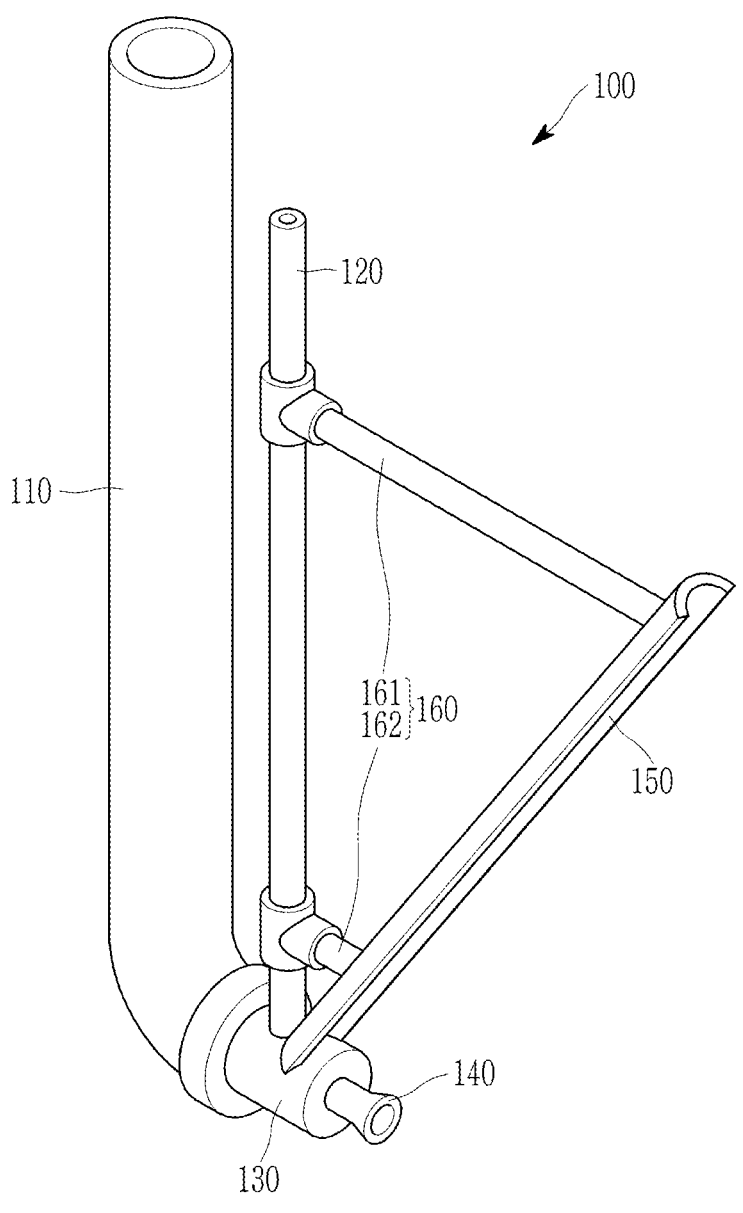
FIG. 3 is a perspective view showing an air lifting Venturi apparatus according to an embodiment of the present invention.

FIG. 3 is a perspective view showing an air lifting Venturi apparatus according to an embodiment of the present invention. FIG. 3 shows the air lifting Venturi apparatus 100 from an angle at which the shape of the air guide 150 may be better revealed.

Referring to FIG. 3, the air guide 150 may be formed in a plate shape having a cross-section convexly rounded upward. The air guide 150 in the plate shape may be provided to obliquely extend from the upper end of the Venturi pipe 130 to the front upper portion in the spraying direction of the spray nozzle 140. Therefore, air bubbles formed in a water tank by air sprayed from the spray nozzle 140 may not move directly above a water surface but may be guided in a direction away from the spray nozzle 140 along the air guide 150 and gradually move toward the water surface. This may allow the air bubbles to stay in the water tank for a longer period of time, and as a result, more oxygen may be dissolved in the water.

Figure 4:
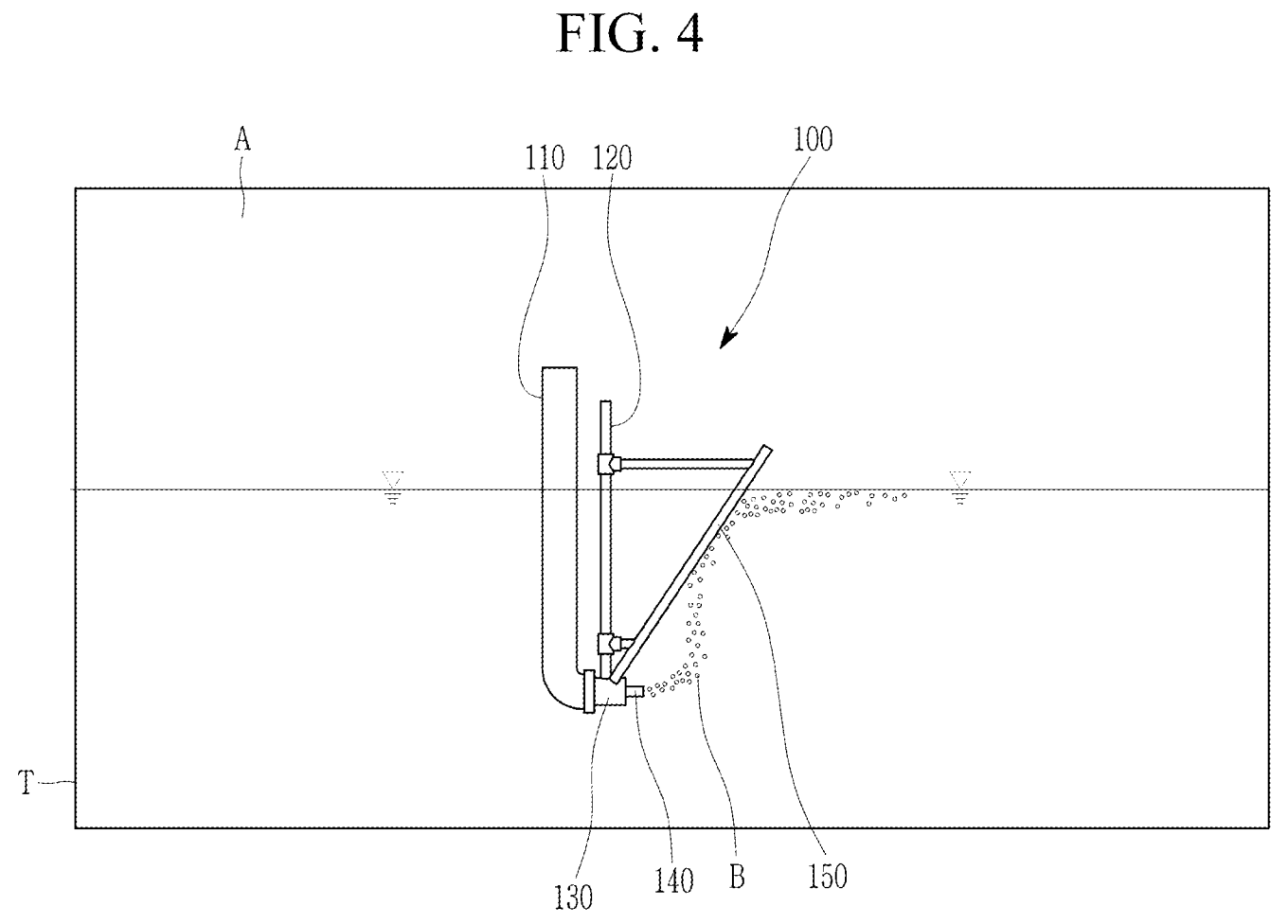

FIG. 4 is a diagram for explaining a state in which an air lifting Venturi apparatus according to an embodiment of the present invention is installed and operates in a water tank.

Referring to FIG. 4, the air lifting Venturi apparatus 100 according to the present embodiment may be installed so that the Venturi pipe 130 is submerged in a water tank T. When water flows in through the first inflow pipe 110 of the air lifting Venturi apparatus 100, the flowed water may be transported to the Venturi pipe 130 connected to the first inflow pipe 110, and according to the characteristics of the Venturi pipe 130, a negative pressure may be applied to the second inflow pipe 120 connected to the neck portion 134 of the Venturi pipe 130 so that air may flow from an atmosphere A. That is, as the pressure inside the second inflow pipe 120 is lower than an atmospheric pressure, air in the atmosphere A may flow into the second inflow pipe 120. To this end, the second inflow pipe 120 may be installed such that an upper end portion having an opening for air inflow is exposed above the water surface. In the first inflow pipe 110, an opening for water inflow may be connected to a water supply pipe (not shown) and may receive water.

As described above, the air guide 150 may be formed to obliquely extend from the upper end of the Venturi pipe 130 toward the front upper portion of the spray nozzle 140 in a spray direction. That is, the air guide 150 may extend upward toward the water surface farther away from the spray nozzle 140. Also, as shown in FIG. 3, the air guide 150 may be formed in a plate shape having a cross-section convexly rounded upward. In addition, the air guide 150 may extend to a height close to the upper end of the second inflow pipe 120, and thus, even when the air lifting Venturi apparatus 100 is installed in the water tank T, the upper end portion of the air guide 150 may be exposed above the water surface.

The air guide 150 formed as above may be provided, and thus, air bubbles B sprayed from the spray nozzle 140 may float upward and may move in the water tank T along the air guide 150 in a direction away from the spray nozzle 140. That is, when the air guide 150 is not provided, the air bubbles B sprayed from the spray nozzle 140 will move vertically toward the water surface due to their nature, but the air guide 150 is provided as in the present embodiment, and thus, the air bubbles B sprayed from the spray nozzle 140 may have the force to move forward by energy generated by colliding with the air guide 150, and accordingly, form horizontal water currents. When the water currents formed as above are continuously formed at regular intervals in the water tank, the entire water in the water tank may be moved horizontally, and the air bubbles B may stay in the water tank as long as possible.

The length of the air guide 150 may be set according to the depth of breeding water in the water tank, and when the air guide 150 has an angle of 45 degrees with respect to the water surface, it may show effects on horizontal water movement and dissolved oxygen supply.

The breeding tank needs to supply oxygen to the maximum using limited energy and, at the same time, prevent organic matters from sinking to the bottom by forming moving water currents. In addition, fish in the water tank may feel the flow of water, which may have a favorable effect on growth or survival. Therefore, it is possible to supply oxygen and mix vertical water, as well as form horizontal water currents with the same power, by utilizing the Venturi pipe 130 and the air guide 150.

Although the preferred embodiments of the present invention have been described above, the present invention is not limited thereto, and various modifications and implementations are possible within the scope of the claims and the description and the accompanying drawings, and it is natural that this also belongs to the scope of the present invention.

<Description of Reference Numerals>

| | |
|---|---|
| 100: air lifting Venturi apparatus | 110: first inflow pipe |
| 112: inflow portion | 114: connection portion |
| 120: second inflow pipe | 130: Venturi pipe |
| 131: inflow port | 132: outflow port |
| 134: neck portion | 135: injection nozzle |
| 136: lateral passage | |
| 140: spray nozzle | 150: air guide |
| 160: support | 161: first support |
| 162: second support | T: water tank |
| A: atmosphere | B: air bubble |

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air lifting Venturi apparatus comprising:
a first inflow pipe extending in the form of a tube to guide inflow of water;
a second inflow pipe extending in the form of a tube to guide inflow of air or oxygen;
a Venturi pipe including a through passage having a neck portion having a diameter smaller than a diameter of an inflow port between the inflow port and an outflow port, wherein the first inflow pipe is connected to the inflow port and the second inflow pipe is connected to the neck portion;
a spray nozzle connected to the outflow port of the Venturi pipe; and
an air guide extending obliquely from an upper end of the Venturi pipe toward an upper portion of the spray nozzle in a spray direction,
wherein the air guide includes a support extending from an upper surface and having one end fixed to the second inflow pipe.

2. The air lifting Venturi apparatus of claim 1, wherein:
the air guide is configured in a plate shape having a cross-section convexly rounded upward.

3. The air lifting Venturi apparatus of claim 1, wherein:
the air guide extends to a height close to an upper end portion of the second inflow pipe.

4. The air lifting Venturi apparatus of claim 1, wherein:
the support includes a first support located close to an upper end portion of the second inflow pipe and a second support located close to a Venturi pipe connection portion of the second inflow pipe.

5. The air lifting Venturi apparatus of claim 1, wherein:
the first inflow pipe includes an inflow portion having an open upper portion and extending vertically and a connection portion extending from a lower end of the inflow portion and bent to be connected to the inflow port of the Venturi pipe.

6. The air lifting Venturi apparatus of claim 1, wherein:
a diameter of the second inflow pipe is formed to be smaller than a diameter of the first inflow pipe.

7. The air lifting Venturi apparatus of claim 1, wherein:
a diameter of the spray nozzle is formed to be smaller than the diameter of the inflow port of the Venturi pipe.

* * * * *